May 24, 1966  G. E. KELLOGG ETAL  3,252,382
FLUID PRESSURE SERVOMOTOR REACTION CONTROL MECHANISM
Filed March 5, 1964
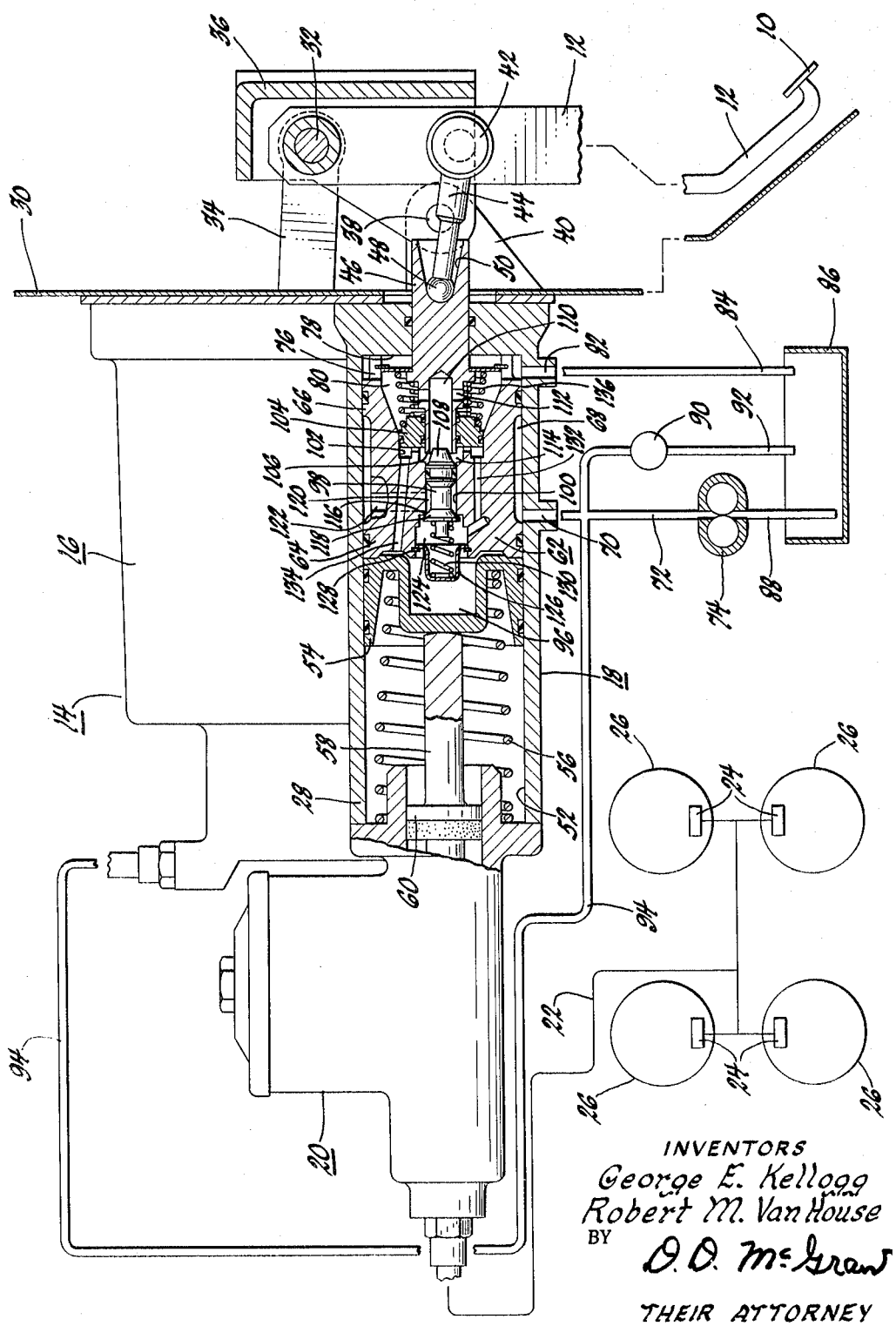
INVENTORS
George E. Kellogg
Robert M. Van House
BY
O. O. McGrant
THEIR ATTORNEY

United States Patent Office 3,252,382
Patented May 24, 1966

3,252,382
FLUID PRESSURE SERVOMOTOR REACTION CONTROL MECHANISM
George E. Kellogg, Miamisburg, and Robert M. Van House, Dayton, Ohio, assignors to General Motors Corporation, Detroit, Mich., a corporation of Delaware
Filed Mar. 5, 1964, Ser. No. 349,654
4 Claims. (Cl. 91—434)

The invention relates to fluid pressure operated servo mechanisms and more particularly to the type of mechanism employed in power braking apparatus wherein fluid reaction is obtained. The invention is an improvement over the fluid servomotor and power braking apparatus disclosed and claimed in application Serial No. 314,044, entitled, "Flush Floor Power Brake Arrangement," and filed October 4, 1963.

That application discloses a hydraulic pressure actuated power brake mechanism which also has a servomotor operating to position the brake pedal in a low position for power operation and in a high position for manual operation. When the system is in the low pedal position, and therefore providing power operation of the brake master cylinder through a fluid pressure actuated servomotor, a valve and chamber arrangement is provided wherein fluid under pressure is directed to a power chamber formed with a power piston as one wall. The power chamber is connected by passage means to a reaction chamber so that the fluid pressure acting in the power chamber acts on a reaction member which transmits the force exerted thereby to the brake pedal to provide brake feel. When such a valve and chamber system is utilized, power may be supplied to the power chamber before being supplied to the reaction member so that the brakes may in fact be applied to some extent before the brake pedal operator has sensed the fact by reaction feel. The invention which is herein disclosed and claimed provides a servomotor arrangement wherein pressure being supplied to the power chamber is at all times supplied to the reaction member first, and when the power chamber is being evacuated, the change in pressure is first sensed by the reaction member. In the preferred embodiment this is accomplished by providing a fluid pressure receiving chamber, a valve mechanism which controls the fluid pressure so as to admit it first to the reaction chamber and then to the power chamber for servo actuation, with the power chamber and the reaction chamber being connected to an exhaust chamber by actuation of the valve means when the servomotor is to be de-energized so that the reaction chamber is fluidly intermediate the power chamber and the exhaust chamber. In the preferred embodiment a wall divides the power chamber from the pressurized output chamber of the valve mechanism so as to route fluid pressure through appropriate passage means to the reaction chamber and then through additional passage means to the power chamber. The dividing wall also provides a control valve biasing spring seat.

In the drawing:

The figure is a schematic representation of a power brake system having a servomotor embodying the invention provided therein for actuating the master cylinder unit, with parts broken away and in section.

The brake system includes the brake pedal 10 mounted on the brake lever arm 12, the power brake unit 14 including the pedal positioning servo 16 and the power servo 18 and the master cylinder assembly 20, the brake actuating pressure distribution conduit system 22, and the wheel cylinders 24 which actuate the brakes at the wheels 26. Although the power servo 18 can be utilized in other systems requiring a reaction, it is illustrated as being used in a system wherein the brake pedal 10 is positioned in a low position by the pedal positioning servo 16 so long as hydraulic fluid pressure is available for power servo operation. This arrangement is more particularly disclosed in the above noted application and reference may be made thereto for details of operation. The power brake unit 14 has a housing 28 fastened to the firewall 30. The brake lever arm 12 is pivoted on pivot 32 which also pivotally connects links 34 and 36. Link 36 is pivoted at pivot 38 to a support bracket 40 operatively secured to housing 28. Link 34 is actuated by the pedal positioning servo 16 so as to hold pivot 32 to the right, in the position shown in the drawing, when hydraulic pressure is available for servo operation, and to move pivot 32 (and therefore link 36) about pivot 38 when there is insufficient fluid pressure supply to power operate the mechanism. Since lever arm 12 is pivotally attached at pivot 42 to a push rod 44, which in turn is pivotally connected with the valve control member 46, lever arm 12 is caused to pivot about the center of the ball 48 formed on the end of push rod 44 and fitting into a socket 50 of valve control member 46. Thus the pedal 10 is suitably positioned.

Housing 28 has a cylinder 52 formed therein in which is received a pressure actuated power wall, this wall being a reciprocably movable power piston 54 in the preferred embodiment. Piston 54 is urged to the right by a piston return spring 56. The piston acts on a push rod 58 which in turn actuates the master cylinder piston 60 of master cylinder assembly 20 to pressurize fluid for actuation of the wheel cylinders 24. A valve housing 62 is also positioned in cylinder 52. The housing is constructed in a spool-like manner with lands 64 and 66 at either end so that the external groove between the lands cooperates with cylinder 52 to provide an annular fluid pressure receiving chamber 68. A fluid pressure inlet 70 in a side wall of cylinder 52 is connected by a conduit 72 to the output side of a fluid pressure generating pump 74. Inlet 70 is fluid connected with chamber 68. The rear end of valve housing 62 is provided with castellations 76 so that land 66 is spaced from the rear wall 78 of cylinder 52. Thus one end of valve housing 62 cooperates with the rear end of chamber 52 to provide an exhaust chamber 80 which is connected through a fluid pressure outlet 82, formed in a side wall of chamber 52, and a conduit 84 to the fluid reservoir 86. Pump 74 receives fluid from reservoir 86 through the pump intake conduit 88. A pressure relief valve 90 is provided in a conduit 92 connected with the pump output conduit 72 so as to limit the pressure provided to the pressure inlet 70 and return excess pumped fluid to the reservoir 86. A conduit 94, also connected with pump output conduit 72, is connected to the pedal positioning servo 16 for pressure actuation thereof as is more fully described in the application referred to above.

A power chamber 96 is provided in cylinder 52 between power piston 54 and the forward end of valve housing 62. A spool type valve member 98 is reciprocably positioned in a bore 100 provided in and extending axially of valve housing 62. Another bore 102 is provided in valve housing 62 at the rear end of bore 100 and has a fluid pressure reaction member 104, which is illustrated as being a piston, reciprocably movable therein. The forward end of valve control member 46 extends through the reaction piston 104 and terminates in an annular valve seat 106 in engageable relation to the valve head 108 formed on the rear end of valve member 98. Passages 110 and 112 (provided in valve control member 46) connect the reaction chamber 114 (provided by bore 102 and valve housing 62 and reaction piston 104) to the exhaust chamber 80 when valve head 108 is unseated from valve seat 106.

A valve seat 116 is provided at the forward end of bore 100 and is engageable by a valve head 118 formed on the forward end of valve member 98. A chamber 120 is therefore provided between the valve heads by the valve member 98 and bore 100. Passage 122 in valve housing 62 fluid connects the fluid pressure receiving chamber 68 and the chamber 120. A controlled fluid pressure output chamber 124 is provided in the forward end of valve housing 62. When valve head 118 is unseated from its valve seat 116, fluid pressure is transmitted to chamber 124. In a mechanism of the type disclosed in the above noted application, chamber 124 is a part of power chamber 96. Thus fluid pressure would be immediately provided to act on the power piston 54. In the structure embodying the invention herein disclosed and claimed, a wall 126 is provided to separate chambers 96 and 124. In the preferred embodiment this wall is a sheet metal thimble having an outer flange sealingly engaging a suitable retainer 128 so as to prevent direct fluid connection of chamber 124 and chamber 96. The thimble also provides a seat and retainer for the valve return spring 130, which urges valve member 98 to the right and holds valve head 118 against seat 116 until the valve is actuated by the valve control member 46. A passage 132 in valve housing 62 connects chamber 124 with reaction chamber 114, and a second passage 134 connects reaction chamber 114 with power chamber 96. Thus fluid pressure received in chamber 124 is first transmitted to reaction chamber 114, where it acts on reaction piston 104 against the force of the reaction springs 136 to transmit a portion of the reaction force to the valve control member and then through push rod 44 and brake lever arm 12 to the pedal 10. The pressure in reaction chamber 114 then passes through passage 134 and is applied to the power piston 54 to move it to the left against spring 56 to actuate the master cylinder assembly 20.

In operation, the operator depresses pedal 10, moving valve control member 46 to the left. This seats valve seat 106 against valve head 108, thus closing off the connection of power chamber 96 and reaction chamber 114 to exhaust chamber 80. Further movement of valve control member 46 pushes valve member 98 to the left against the force of valve return spring 130, lifting valve head 118 from valve seat 116. Thus a lapped valve arrangement is provided. Fluid pressure is therefore modulated into chamber 124. The reaction piston 104 and the power piston 54 are then actuated as above described. When the brake pedal 10 is released, valve head 118 immediately seats against valve seat 116, cutting off the supply of fluid pressure to the reaction chamber and the power chamber. Valve control member 46 is moved to the right by one of the reaction springs 136 and valve seat 106 is then unseated from valve head 108. This opens power chamber 96 to exhaust through valve seat 106, reaction chamber 114, passages 110 and 112. It can thus be seen that the changes in fluid pressure in the reaction chamber 114 act on reaction member 104 slightly before or as soon as they act on power piston 54, so that there is no delay in the reaction feel transmitted to the brake operator.

In the claims:
1. In combination in a fluid pressure operated power servo; a housing having a bore therein; a power wall movably mounted in said bore; a valve body mounted in said housing and having one end thereof in said bore cooperating with said power wall to define a power chamber; said valve body having valve means therein including valve spring means and a seat receiving said spring means, a fluid pressure input chamber, a fluid pressure output chamber having a first wall defined by said valve body one end and a second wall formed by said valve spring means seat fluid separating said power chamber and said output chamber, a fluid pressure exhaust chamber, a fluid pressure reaction chamber, first passage means connecting said fluid pressure output chamber to said fluid pressure reaction chamber, and second passage means connecting said fluid pressure reaction chamber to said power chamber; and a valve means control member having a reaction member mounted thereon providing a wall common to and separating said fluid pressure reaction chamber and said fluid pressure exhaust chamber, said control member actuating said valve means to selectively control fluid pressure from said input chamber to said output chamber and from said reaction chamber to said exhaust chamber, and said fluid pressure output second wall separating said power chamber and said pressure output chamber forcing fluid pressure from said output chamber through said first passage means to said reaction chamber to act on said reaction member before being applied to said power chamber.

2. A fluid pressure actuated unit comprising, a housing having a cylinder formed therein, a valve housing axially received in said cylinder and having a power chamber on one end thereof and an exhaust chamber on the other end thereof and a fluid pressure receiving chamber therein and a reaction chamber therein fluidly intermediate said fluid pressure receiving chamber and said power chamber and also fluidly intermediate said power chamber and said exhaust chamber, a movable power wall in said cylinder and forming a wall of said power chamber, valve means having valve spring means and a seat for said spring means mounted in said valve housing and selectively fluid connecting and disconnecting said fluid pressure receiving chamber and said power chamber through said reaction chamber and selectively disconnecting and connecting said power chamber and said exhaust chamber through said reaction chamber, said valve spring means seat fluid separating said power chamber and said reaction chamber fluidly adjacent said receiving chamber.

3. The unit of claim 2, said valve means comprising a lapped pair of valves, one of said valves controlling the connection of said power chamber to said exhaust chamber and the other of said valves controlling the connection of said fluid pressure receiving chamber to said power chamber, said valve housing having a valve spring means chamber in the power chamber end thereof into which fluid pressure passes when said other valve is open and passage means fluid connecting said valve spring means chamber and the reaction chamber, and said valve spring means seat secured to said valve housing and sealingly separating said valve spring means chamber and said power chamber to direct fluid pressure to said reaction chamber before it is delivered to said power chamber.

4. A fluid pressure actuated unit comprising, a housing having a cylinder formed therein, a valve housing axially received in said cylinder and having a power chamber on one end thereof and an exhaust chamber on the other end thereof and a fluid pressure receiving chamber therein and a reaction chamber therein fluidly intermediate said fluid pressure receiving chamber and said power chamber and also fluidly intermediate said power chamber and said exhaust chamber, a movable power wall in said cylinder and forming a wall of said power chamber, and valve means mounted in said valve housing and selectively fluid connecting and disconnecting said fluid pressure receiving chamber and said power chamber through said reaction chamber and selectively disconnecting and connecting said power chamber and said exhaust chamber through said reaction chamber, said valve means comprising a lapped pair of valves, one of said valves controlling the connection of said power chamber to said exhaust chamber and the other of said valves controlling the connection of said fluid pressure receiving chamber to said power chamber, said valve housing having a valve spring chamber in the power chamber end thereof into which fluid pressure passes when said other valve is open and passage means fluid connecting said valve spring chamber and the reaction chamber, and a valve spring seat secured to said valve housing and sealingly separating said valve spring chamber and said power chamber to direct fluid pressure to said reaction chamber before it is delivered to said power chamber.

References Cited by the Examiner

UNITED STATES PATENTS

| | | | |
|---|---|---|---|
| 3,067,727 | 12/1962 | Ayers et al. | 91—434 |
| 3,074,383 | 1/1963 | Schultz | 91—434 |
| 3,076,441 | 2/1963 | Ayers | 91—434 |

SAMUEL LEVINE, *Primary Examiner.*

P. E. MASLOUSKY, *Assistant Examiner.*